(12) United States Patent
Suiter

(10) Patent No.: US 7,760,438 B1
(45) Date of Patent: Jul. 20, 2010

(54) AIR-TO-WATER DE-ANAMORPHOSER AND METHOD OF AIR-TO-WATER DE-ANAMORPHOSIS

(75) Inventor: Harold Suiter, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 379 days.

(21) Appl. No.: 11/900,145

(22) Filed: Sep. 11, 2007

(51) Int. Cl.
 *G02B 13/10* (2006.01)

(52) U.S. Cl. ..................... 359/669; 359/837; 359/900

(58) Field of Classification Search ......... 359/831–837, 359/668–669, 640, 900
See application file for complete search history.

(56) References Cited

U.S. PATENT DOCUMENTS 5,526,177 A * 6/1996 Fantone ............... 359/402

OTHER PUBLICATIONS

Raymond Serway, Physics for Scientists and Engineers vol. 2, 4th Ed. (Philadelphia 1999).*

* cited by examiner

*Primary Examiner*—Stephone B Allen
*Assistant Examiner*—Jennifer L. Doak
(74) *Attorney, Agent, or Firm*—James T. Shepherd

(57) ABSTRACT

A full or partial air-to-water de-anamorphoser and method of air-to-water de-anamorphosis is provided. A housing has a planar transparent window in one end thereof adjacent to a defined air space. The housing is placed under the water's surface with an acute angle being formed between the window and the water's surface to thereby define a virtual prism whose center leads its apex. An optical prism having an apex and a center is positioned in the housing's air space and is spaced apart from the housing's window such that the prism's apex leads its center as measured along a line parallel to light exiting the prism. The light exiting the prism was originally incident on the water's surface, subsequently traveled through the water, and then was passed sequentially through the housing's window, the housing's air space and the prism.

19 Claims, 3 Drawing Sheets

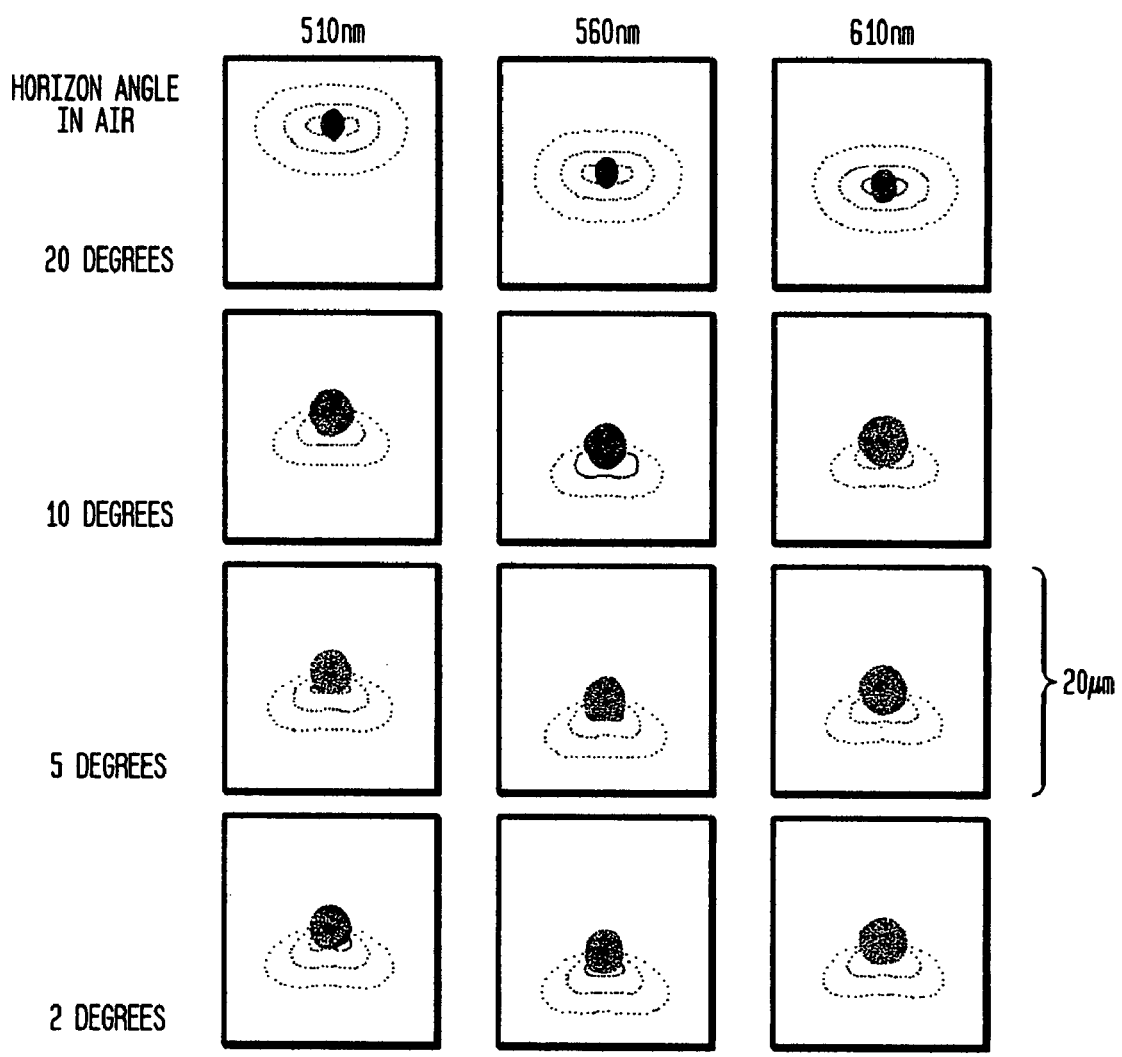

AIR-TO-WATER DE-ANAMORPHOSER AND METHOD OF AIR-TO-WATER DE-ANAMORPHOSIS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to the de-anamorphosis of light, and more particularly to an air-to-water de-anamorphoser and method of using same to perform full or partial air-to-water de-anamorphosis.

BACKGROUND OF THE INVENTION

Anamorphosis is defined as the stretching of images but not otherwise blurring them. In many cases, this is done intentionally to achieve aesthetic or technical advantages. However, the natural occurrence of anamorphosis can be problematic. For example, an underwater "viewer" looking up out of the water sees the whole half-sphere (above the water's surface) in principle, but sees it in a highly distorted manner. The change of media from air to water makes everything appear to occupy a smaller angle. Even images at the viewer's zenith are smaller than they would appear than if the transmission medium were uniform. Thus, the underwater viewer sees the horizon-to-horizon out-of-water world confined to a broad cone. The dimensions of this cone can be calculated using Snell's Law. In general, if $\theta_{incident}$ is the horizon angle of incidence and $\theta_{exiting}$ is the horizon angle of exit, then Snell's Law can be written as $n_{incident} \cos(\theta_{incident}) = n_{exiting} \cos(\theta_{exiting})$, where $n_{incident}$ is the refraction index of the medium before the ray is incident on the interface and $n_{exiting}$ is the refractive index of the medium after the ray exits the interface. For example, if $n_{incident}$ is 1.0 (i.e., the approximate index of air), $n_{exiting}$ is 1.34 (i.e., the approximate index of seawater), and $\theta_{incident}$ is 0 degrees (i.e., light coming from the horizon), then $\theta_{exiting}$ is 41.73 degrees. Thus, all of the light that an underwater viewer sees appears to be coming from between 41.73 degrees from the viewer's horizon to the viewer's zenith.

As the underwater viewer's field of view approaches the air horizon, objects appear more and more compressed vertically relative to their horizontal extent. For a square object 10 degrees above the horizon, its underwater aspect appears compressed to a height only one-fourth of its length. This anamorphic compression is objectionable to a viewer of a scene.

SUMMARY OF THE INVENTION

Accordingly, it is an object of the present invention to provide an air-to-water de-anamorphoser system and method.

Another object of the present invention is to provide an air-to-water de-anamorphoser that compensates for lateral chromatic aberrations that occur when viewing objects above the water's surface from beneath the water's surface.

Other objects and advantages of the present invention will become more obvious hereinafter in the specification and drawings.

In accordance with the present invention, an air-to-water de-anamorphoser includes a housing defining an air space therein. A planar transparent window is in one end of the housing adjacent to its defined air space. The housing is adapted to be placed under the surface of a body of water with an acute angle being formed between the window and the water's surface to thereby define a virtual prism whose center leads its apex. An optical prism having an apex and a center is positioned in the housing's air space and is spaced apart from the housing's window such that the prism's apex leads its center as measured along a line parallel to light exiting the prism. The light exiting the prism was originally incident on the water's surface, subsequently traveled through the water, and then was passed sequentially through the housing's window, the housing's air space and the prism.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a graphical spot diagram of an example embodiment's performance in terms of the achromatism.

DETAILED DESCRIPTION OF THE INVENTION

Figure 1:
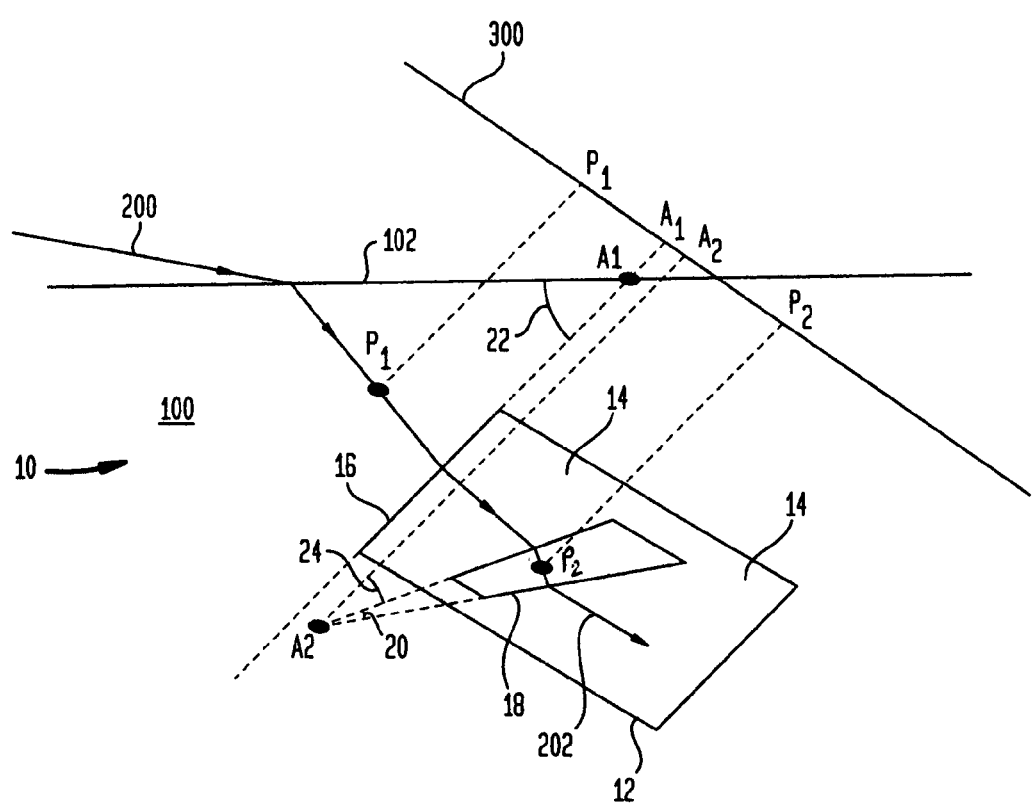
FIG. 1 is a schematic view of an air-to-water de-anamorphoser in accordance with an embodiment of the present invention.

Referring now to the drawings and more particularly to FIG. 1, a schematic of air-to-water de-anamorphoser in accordance with the system and method of the present invention is shown and is referenced generally by numeral 10. De-anamorphoser 10 is capable of achieving partial to full de-anamorphosis depending on system set-up and the relative position of the target object/light. In order to clearly illustrate the novel features of the present invention, only the essential optical aspects of the de-anamorphoser 10 are shown. However, it is to be understood that various mechanical and electrical support structures can be (and typically would be) incorporated into de-anamorphoser 10. Such support structures are well known in the art and are not limitations of the present invention.

The basic features of de-anamorphoser 10 include the following:

a housing 12 defining an air cavity 14 therein and having a transparent window 16 at one end thereof, an optical prism 18 disposed in air cavity 14 and spaced apart from window 16, and the positioning of (i) housing 12 in water 100, and (ii) prism 18 in air cavity 14 as will be described in detail below.

Housing 12 is any type of watertight structure that will maintain the integrity of air cavity 14 when housing 12 is placed in water 100. The size, shape, and construction details of housing 12 can be tailored for a particular application and are not limitations of the present invention. Transparent window 16 is a planar window made from any material (e.g., glass, plastic, etc.) that allows light to pass through. Window 16 can be fixedly mounted in housing 12 so that position changes in housing 12 cause corresponding position changes in window 16. Window 16 could also be movably mounted in housing 12 to provide for independent positioning of window 16.

Optical prism 18 is any transparent solid prism. Typically, prism 18 is made from a transparent glass or plastic. In accordance with the present invention, the material selected for prism 18 has an index of refraction and dispersion that is greater than that of water. In the illustrated embodiment, prism 18 is a triangular (e.g., having a triangular or trapezoidal shape) prism having an apical angle (referenced by numeral 20) to thereby define an apex $A_2$. When a beam of light passes through prism 18, an average or beam center position within the beam is defined and is denoted as $P_2$. Prism 18 can be fixedly or adjustably positioned in air cavity 14 in relation to window 16 in order to satisfy requirements of the present invention.

Housing 12 is positioned in water 100 such that an acute angular relationship is defined between the surface 102 of water 100 and window 16. The formed acute angle (referenced by numeral 22) can be considered to be the apical angle of a virtual optical prism that has an apex $A_1$ located on surface 102 and an average or beam center position within the beam passing through water 100 that is denoted as $P_1$. For example, with housing 12/window 16 positioned as shown, light 200 from just above the horizon of the air environment is incident on water surface 102, transverses the region of water 100 defining a virtual prism, passes through window 16 and a portion of air cavity 14, passes through prism 18, and exits prism 18 as light traveling along the direction indicated by light path 202.

Housing 12, window 16 and prism 18 are positioned such that the following two requirements are satisfied:

(i) Apex $A_1$ of the virtual water prism trails its center $P_1$ when measured along a line 300 that is parallel to light path 202 exiting prism 18, and (ii) Prism 18 is tilted at an angle 24 with respect to window 16 such that apex $A_2$ of prism 18 leads its beam center $P_2$ thereof when measured along line 300.

Note that the order of the four parameters (i.e., $A_1, P_1, A_2, P_2$) is not a limiting factor so long as the above two requirements are satisfied. Depending on how the present invention is constructed, these two requirements are satisfied by the proper positioning of one or more of housing 12, window 16 and prism 18. That is, window 16 and/or prism 18 could occupy fixed positions in housing 12, or could be mounted in housing 12 for the adjustable positioning thereof without departing from the scope of the present invention.

The advantages of the present invention are numerous. Test systems constructed in accordance with the present invention have achieved improvements in air-to-water anamorphic distortion. The amount of improvement varies with adjustments in apical angles 20 and 22, as well as tilt angle 24 between window 16 and prism 18 and the index of refraction an dispersion of prism 18. In addition, the present invention's use of a virtual water prism and a second optical prism separated from the water prism by air corrects for lateral chromatic aberrations typically associated with air-to-water transmission through the water at an angle.

Figure 2:
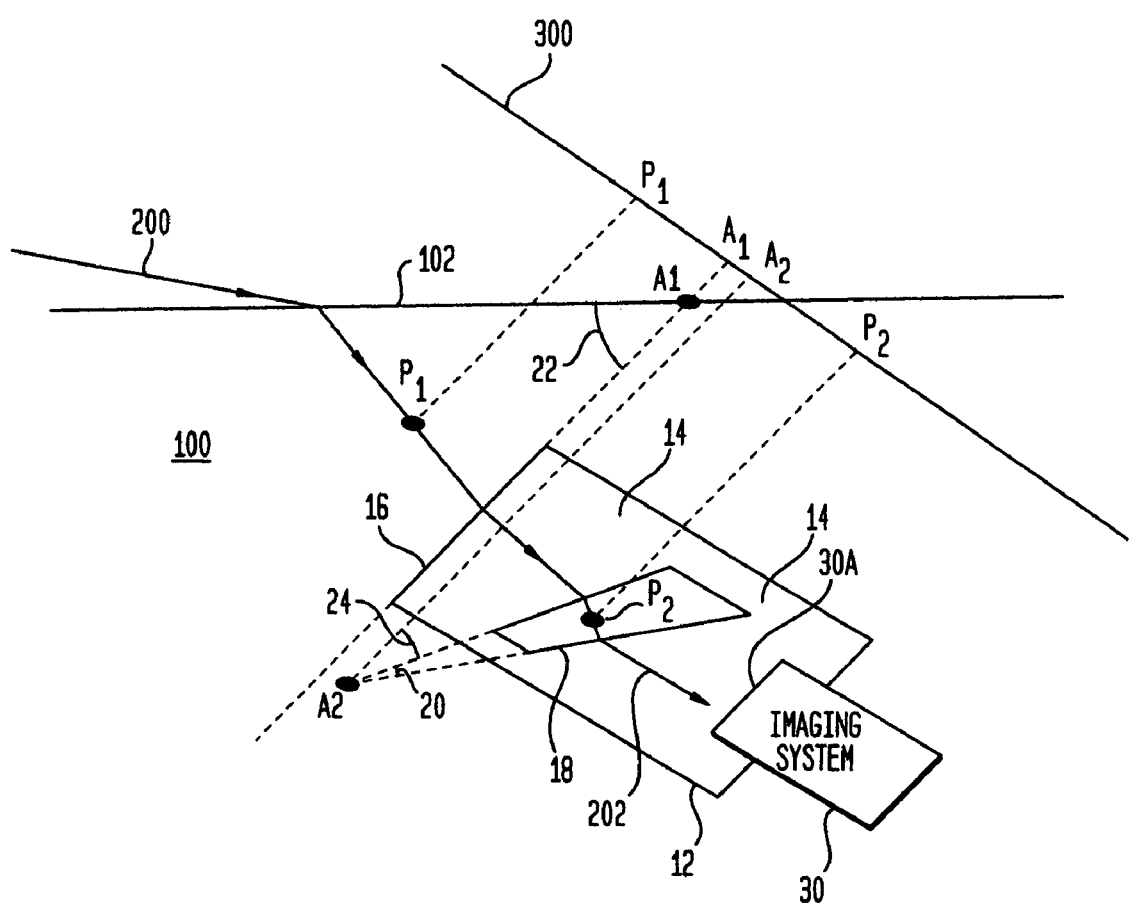
FIG. 2 is a schematic view of the air-to-water de-anamorphoser of the present invention with an imaging system coupled thereto for processing the distorted light.

The present invention can provide "front end" de-anamorphosis for an imaging system that is used underwater to image light/objects in the air environment. Accordingly, FIG. 2 shows the present invention with an imaging system 30 coupled thereto. More specifically, the aperture 30A of imaging system 30 is located/positioned in air cavity 14 so that the light exiting prism 18 and traveling along light path 202 is incident on aperture 30A. Imaging system 30 can be an image capture device or camera, an optical system for relaying light traveling along direction 202 to another end "user" (e.g., a relay system used by periscopes), or simply an eye that receives the light traveling along light path 202.

By way of illustration, one example employing the principles of the present invention will now be described. Prism 18 was made of a typical flint glass having a refractive index of 1.620 at 587 nanometers (nm), an Abbe dispersion number of 36.37, and an apical angle 20 of 25 degrees. Angle 22 of window 16 with respect to sea surface 102 was set to 62 degrees thereby making optical path 202 directed at 28 degrees above the horizon. Tilt angle 24 was set so that the prism face was tilted away from window 16 by 25 degrees. Note that tilt angle 24 was only coincidentally equal to apical angle 20. Light along optical path 202 was imaged by a lens with a forward aperture stop forming aperture 30A. For this example, imaging system 30 was a French landscape lens of aperture ratio f/7. FIG. 3 displays a spot diagram showing the achromatism of this embodiment for three wavelengths and four angles of incidence. The de-anamorphosis of this example is fairly mild, reaching only slightly above 1.4.

Although the invention has been described relative to specific embodiments thereof, there are numerous variations and modifications that will be readily apparent to those skilled in the art in light of the above teachings. For example, the apical angles of the virtual water prism and real prism 18 can be changed to suit particular requirements/performance, as can tilt angle 24 formed between prism 18 and window 16. Furthermore, air cavity 14 could be replaced with another transparent media provided the index of refraction of this media was different than that of water 100 and prism 18. It is therefore to be understood that, within the scope of the appended claims, the invention may be practiced other than as specifically described.

What is claimed as new and desired to be secured by Letters Patent of the United States is:

1. An air-to-water de-anamorphoser comprising:
    a housing defining an enclosed air space therein and having a planar transparent window in one end thereof adjacent to said enclosed air space, said housing adapted to be placed under the surface of a body of water with an acute angle being formed between said window and the surface; and
    an optical prism having an apex and a center defined with respect to a beam of light passing therethrough, said prism positioned in said enclosed air space and spaced apart from said window such that said apex leads said center as measured along a line parallel to light exiting said prism, wherein the light exiting said prism was (i) incident on the surface, (ii) traveled through the water, and (iii) passed sequentially through said window, said enclosed air space and said prism.

2. An air-to-water de-anamorphoser as in claim 1 wherein said prism is a triangular prism.

3. An air-to-water de-anamorphoser as in claim 1 wherein said prism has a dispersion and an index of refraction that is greater than that of water.

4. An air-to-water de-anamorphoser as in claim 1 further comprising an imaging system having an entrance aperture positioned in said enclosed air space with said prism being disposed between said window and said imaging system.

5. An air-to-water de-anamorphoser as in claim 4 wherein said imaging system is selected from the group consisting of an eye, an optical relay system, and a camera.

6. An air-to-water de-anamorphoser as in claim 1 wherein said prism is made from a material that is selected from the group consisting of glass and plastic.

7. An air-to-water de-anamorphoser comprising:

a housing defining an enclosed air space therein and having a planar transparent window formed in one end thereof adjacent to said enclosed air space, said housing adapted to be placed under the surface of a body of water with an acute angle being formed between said window and the surface wherein a region of water is defined between the surface and said window, said region forming a virtual optical prism having a virtual apex and a virtual center defined with respect to a beam of light passing therethrough; and an optical prism having an apex and a center defined with respect to a beam of light passing therethrough, said prism positioned in said enclosed air space and spaced apart from said window such that said apex leads said center with respect to light passing through said window and subsequently said prism as measured along a line that is parallel to the light exiting said prism, wherein said housing is positioned in the water such that said virtual apex trails said virtual center as measured along the line that is parallel to the light exiting said prism.

8. An air-to-water de-anamorphoser as in claim 7 wherein said virtual prism and said prism are triangular prisms.

9. An air-to-water de-anamorphoser as in claim 7 wherein said prism has a dispersion and an index of refraction that is greater than that of water.

10. An air-to-water de-anamorphoser as in claim 7 further comprising an imaging system having an entrance aperture positioned in said enclosed air space with said prism being disposed between said window and said imaging system.

11. An air-to-water de-anamorphoser as in claim 10 wherein said imaging system is selected from the group consisting of an eye, an optical relay system, and a camera.

12. An air-to-water de-anamorphoser as in claim 7 wherein said prism is made from a material that is selected from the group consisting of glass and plastic.

13. A method of de-anamorphosizing light entering water from the air, comprising the steps of:

providing an enclosed and air-filled housing having a planar transparent window in one end thereof and an optical prism in said housing and spaced apart from said window, said prism having an apex and a center defined with respect to a beam of light passing therethrough;

placing said housing under the surface of a body of water such that an acute angle is formed between said window and the surface; and positioning at least one of said prism, said housing and said window such that said apex leads said center with respect to light that sequentially (i) impinges on the surface, (ii) passes through said window, (iii) said prism, and (iv) exits said prism, as measured along a line parallel to the light exiting said prism.

14. A method according to claim 13 wherein said prism is a triangular prism.

15. A method according to claim 13 wherein said prism has a dispersion and an index of refraction that is greater than that of water.

16. A method according to claim 13 further comprising the step of imaging the light exiting said prism.

17. A method according to claim 16 wherein said step of imaging comprises the step of capturing at least a portion of the light exiting said prism.

18. A method according to claim 16 wherein said step of imaging comprises the step of relaying at least a portion of the light exiting said prism.

19. A method according to claim 13 wherein said prism is made from a material that is selected from the group consisting of glass and plastic.

* * * * *